United States Patent Office 3,225,419
Patented Dec. 28, 1965

3,225,419
ROLLER FOR APPLYING FOUNTAIN SOLUTION IN LITHOGRAPHIC PRINTING
Walter H. Milton, Far Rockaway, N.Y., and Paul W. Greubel, Short Hills, N.J., assignors to Interchemical Corporation, New York, N.Y., a corporation of Ohio
No Drawing. Filed Nov. 12, 1963, Ser. No. 323,103
18 Claims. (Cl. 29—132)

This invention relates to a novel dampener roller used to apply fountain solution to the plate cylinder in lithographic printing. More particularly, this novel dampener roller may be most effectively used in the new planographic process described in copending patent application S.N. 141,540, filed September 28, 1961, now Patent No. 3,167,005, issued January 26, 1965, disclosure of which is made a part of this disclosure by reference. This new planographic process eliminates the water fountain solution used in lithographic printing, thereby permitting the use of inks other than oil inks, resin-hydrocarbon inks or oleoresinous inks in planographic printing. This process which employs a volatile hydrocarbon fountain solution which when applied to the plate covers the non-image areas thereof, uses a planographic plate in which the non-image areas are retentive of the volatile hydrocarbon while the image areas are preferably wetted by the ink.

In the fountain system of such a planographic process, it is critical that the dampener rollers or form rollers which contact the plate be retentive of the hydrocarbon fountain solution while repelling the inks, particularly the glycol-type inks used in the novel planographic process of application S.N. 141,540. As indicated in said copending application, the standard cotton or molleton covered rollers used in the fountain system of conventional lithographic presses have an affinity for glycols. Thus, when glycol inks are used in the process of said application with cotton or molleton covered rollers, the dampener or form rollers of the fountain system which are in contact with the plate cylinder pick up the inks and carry them into the fountain system, dirtying the rollers of the system and accordingly prevent the system from depositing a clean layer of fountain solution on the non-image areas of the plate. In addition, the dampener rollers apply streaks of this picked-up ink onto the plate from which the streaks are transferred to the sheets or web being printed on.

As indicated in said copending application various substitutes were tried as dampener rollers and with some success. For example, a dampener roller covered with a fabric of glass fibers coated with tetrafluoroethylene prevented dirtying and ink pick-up in the fountain system. However, with the sustained usage required in a commercial printing job, the glass fabric could not be maintained on the roller and tended to become detached. Likewise, with prolonged usage in a commercial operation both wool covered dampener rollers and glue-glycerin dampener rollers tended to become inked-up and dirty.

We have now discovered a novel roller which when used as a fountain solution dampener roller in this novel planographic process, effectively repels the ink and displays no ink pick-up, dirtying or the consequent streaking of the printed substrate even after prolonged use.

Our novel dampener roller comprises a roller preferably of rubber covered with a cured coating comprising a crosslinking silicone resin and a silane of the formula (RO)₃Si(CH₂)₃NHCH₂CH₂NH₂ in which R is an alkyl radical of less than four atoms, preferably methyl or ethyl.

While the roller is preferably rubber, other resilient materials such as polyurethanes and glue-glycerin may be used as long as the roller material is one to which the above mentioned coating displays good adhesion.

The preparation of the silanes used in the coatings of this invention as well as a more extensive description of these silanes may be found in U.S. Patent 2,971,864, issued to J. L. Speier.

The crosslinking silicone resins used in this invention preferably are thermosetting alkyl and aryl substituted polysiloxanes including thermosetting alkyl siloxanes such as dimethylpolysiloxane resin and thermosetting alkyl-aryl polysiloxanes for example a methylphenylpolysiloxane having an average degree of substitution of 1.3 methyl and phenyl radicals per silicon atom. Very good results have been achieved with a thermosetting polysiloxane copolymer comprising 37% by weight of dimethylsiloxane units (CH₃)₂SiO, 56% of phenyl siloxane units (C₆H₅SiO₁.₅)

and 7% methyl siloxane (CH₃SiO₁.₅).

When using the above silicone resins, the coating applied to the rubber roller is preferably cured by baking. However, particularly effective results have also been achieved by using, in combination with the silanes, the air-drying silicone resin composition described in U.S. Patent No. 2,843,555 to C. A. Berridge.

The silicone resin composition of Patent No. 2,843,555, may be described as a mixture of ingredients comprising (1) a linear, fluid organopolysiloxane containing terminal silicon-bonded hydroxy groups convertible to the cured, solid, elastic state and having a viscosity of from 1,000 to 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicates corresponding to the general formula $$\text{RO}-\underset{\underset{\text{OR}}{|}}{\overset{\overset{\text{OR}}{|}}{\text{Si}}}-\text{R}'$$

where R is a member selected from the class consisting of alkyl groups and halogen-substituted alkyl groups, and R' is a member selected from the class consisting of alkyl, halogen substituted aryl, aralkyl, alkaryl, alkoxy, aryloxy groups, and halogenated derivatives of the aforesaid aryl, aralkyl, arlkaryl, alkoxy and aryloxy groups and (b) liquid partial hydrolysis products of the aforementioned organosilicate monomeric compounds, and (3) a metallic salt of an organic monocarboxylic acid in which the metal ion is selected from the class consisting of lead, tin, zirconium, antimony, iron, cadmium, barium, calcium, titanium, bismuth, and manganese.

(1) The organopolysiloxanes used in the above composition have the general formula:

$$\text{HO}-\!\!\left[\underset{\underset{\text{R}''}{|}}{\overset{\overset{\text{R}'}{|}}{\text{Si}}}-\text{O}\right]_{\!x}\!\!-\text{H}$$

where R' and R'' have the meanings given above, and X is a whole number above 1, e.g. from 2 to 100 or more. There will be present two organic groups per silicon atom.

(2) The alkyl silicates in the above composition, may be a group of organic silicates (either unhydrolyzed or hydrolyzed liquid products) having the general formula:

$$\text{RO}-\underset{\underset{\text{OR}}{|}}{\overset{\overset{\text{OR}}{|}}{\text{Si}}}-\text{R}'$$

such compounds may be varied depending on the designation of R and R' in the formula. Thus, for example, R may be methyl, ethyl, propyl, isopropyl, butyl, amyl, isoamyl, octyl, isooctyl, decyl, dodecyl, halogenated alkyls, e.g., beta-chloroethyl, etc. radicals. R' may be the same as R including halogenated derivatives of alkyl groups as, for example, the chlorinated, brominated, fluorinated, etc. radicals, and the number of such halogens on the alkyl group may be of course varied, for example, from 1 to 4 or more. In addition, R' may include alkoxy and aryloxy groups corresponding to the general formula, —OZ, where Z is, for instance, an alkyl group of the same class described above for R, or, additionally, Z may be an aryl, aralkyl, and alkaryl radical, for example, phenyl, tolyl, xylyl, benzyl, phenylethyl, naphthyl, anthracyl, biphenyl radicals as well as various halogenated derivatives of these aryl, aralkyl and alkaryl radicals, attached to the silicon atom through the medium of an oxygen atom. Thus, the halogens, for example, chlorine bromine, etc., may be attached to any position in the alkyl group or in the aryl group and may comprise any number of halogens. When halogen is attached to an alkyl group, either in the R or R' radical, it is preferable that the halogen should not be attached to the alpha carbon atom in order to attain improved stability of such substituted alkyl groups.

As examples of monomeric organo-silicon compounds or organic silicates these are preferably used organosilicates corresponding to the general formula $(RO)_4Si$, where R is an alkyl group as defined above. In addition to employing the liquid monomeric organosilicates described above in the practice of the present invention, there may also be used liquid, partially hydrolyzed products derived therefrom. Such hydrolysis products are generally obtained by effecting partial hydrolysis in water of the particular monomeric organosilicates in the presence of small amounts of acid to a point where it is still water-insoluble and it is still possible to isolate a liquid, partially hydrolyzed organosilicate compound. Thus, taking as a specific example the controlled partial hydrolysis of ethyl silicate having the formula $(C_2H_5O)_4Si$, the hydrolysis of the latter may be carried out by adding acids or acid-forming metal salts to the liquid monomeric organosilicate, for instance $FeCl_3$, $CuCl_2$, $AlCl_3$, $SnCl_4$, etc., and thereafter effecting suitable hydrolysis of this mixture of ingredients in water to obtain the two-phase composition from which the water-insoluble, partially hydrolyzed organosilicate can readily be separated from the aqueous phase and catalyst.

(3) Only certain metallic salts or organic carboxylic acids may be employed in the practice of the present invention to give satisfactory cures. Examples of suitable acid radicals are those yielding the resinate, linoleate, stearate, oleate, or even the lower acid radicals such as those yielding the acetate, the butylrate, octoate, etc. Metallic salts of naphthenic acid especially are suitable. The metal ion of the metal salt is one selected from the class consisting of lead, tin, zirconium, antimony, iron, cadnium, barium, calcium, titanium, bismuth and manganese. Examples of such salts may be, for instance, tin naphthenate, dibutyltin dilaurate, lead octoate, tin octoate, iron stearate, tin oleate, antimony octoate, tin butyrate, etc. The soluble salts, that is, salts which are soluble in the organopolysiloxane containing terminal silicon-bonded hydroxy groups, are preferred, as for example, lead and tin and salts especially because of their marked catalytic activity in combination with the alkyl silicate.

It should be noted that in the present specification and claims, all proportions are by weight unless otherwise set forth.

The roller may either be coated with a composition comprising a blend of the silane and the silicone resin or the silane may be applied to the roller first as a primer coat after which the silicone resin is applied as a top coat. The latter procedure is preferably used when the silicone resin composition is that described in Patent No. 2,843,555.

The following examples will further illustrate this invention:

EXAMPLE 1

A conventional lithographic press dampener roller made of neoprene rubber (polymer of 2-chloro-1,3-butadiene) is coated with the following composition:

Parts by weight
A 65% solution in xylene of polysiloxane copolymer consisting of 37% by weight dimethylsiloxane $((CH_3)_2SiO)$ units, 56% phenyl siloxane $(C_6H_5SiO_{1.5})$ units and 7% methyl siloxane $(CH_3SiO_{1.5})$ units _____ 95.5
$(CH_3O)_3Si(CH_2)_3NHCH_2CH_2NH_2$ _____ 0.5 at a wet coating thickness in the order of from $2\times10^{-3}$ to $2\times10^{-4}$ inches. The coated roller is then baked at 300° F. for 1 hour to cure the coating.

The resulting rollers are then tested in the lithographic press and method described in copending application Serial No. 141,540, filed by P. Greubel on September 28, 1961, using a fountain solution of an aliphatic hydrocarbon having a boiling range of 145° to 175° F. and an ink having a glycol solvent. The novel roller of this invention is used in place of the dampener or form rollers in the fountain system which are in contact with the plate. After 2000 impressions, there is substantially no pick-up of ink by the dampener rollers or any of the other rollers of the fountain system.

EXAMPLE 2

Example 1 is repeated following the same procedure and conditions except that in place of the coating composition of Example 1, the following composition is used:

Parts by weight
A 65% solution in xylene of dimethylpolysiloxane resin _____ 95.5
$(C_2H_5O)_3Si(CH_2)_3NHCH_2CH_2NH_2$ _____ 0.5

The resulting coated roller stands up as well as the roller of Example 1 when used in the lithographic method described in said example.

EXAMPLE 3

Example 1 is repeated following the same procedure and conditions except that in place of the coating composition of Example 1, the following composition is used.

Parts by weight
A 65% solution in xylene of methylphenylpolysiloxane having an average substitution of 1.3 methyl and phenyl radicals per silicone atom _____ 95.5
$(CH_3O)_3Si(CH_2)_3NHCH_2CH_2NH_2$ _____ 0.5

The resulting coated roller stands up as well as the roller of Example 1, when used in the lithographic method described in said example.

EXAMPLE 4

*Preparation of organopolysiloxane*

In accordance with the procedure of Example 1 of U.S. Patent 2,843,555, a linear organopolysiloxane containing terminal silicon-bonded hydroxy groups is prepared by heating 100 parts of octamethylcyclotetrasiloxane for about 2 to 4 hours at a temperature of about 140° C. with about 0.01% by weight, of potassium hydroxide until a highly viscous mass bordering on a gummy solid is obtained. This linear, long-chain methylpolysiloxane has a viscosity of about 2,000,000 centipoises, and has a ration of about two methyl groups per silicon atom. This high molecular weight methylpolysiloxane is mixed with 5% the weight thereof of water and the mixture is heated with stirring for two hours at 150° C. to 175° C. until a product having a viscosity of about 2,000 centipoises (at least 30° C.) is obtained. This material is a linear, methylpolysiloxane having terminal silicon-bonded hydroxyl groups. To 100 parts of this low molecular weight polymer are added 20 parts of diatomaceous earth, 20 parts of zinc oxide, 30 parts of calcined clay and 2 parts of the liquid water-insoluble hydrolysis product of tetraethyl silicate which is a polyethylsilicate having about 40% available silica and the formula:

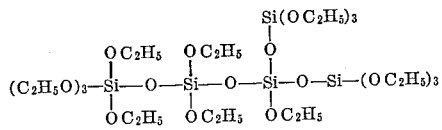

sold under the mark Ethyl Silicate 40. (The procedure for making the partial hydrolysis products of the monomeric organosilicon compounds described above may be found in the article by H. D. Hogan and C. A. Setterstrom entitled "Ethyl Silicates" in Ind. and Eng. Chemistry, vol. 39, p. 1364, 1947.)

*Coated roller*

A neoprene dampener roller is coated with a primer coating of $(CH_3O)_3Si(CH_2)_3NHCH_2CH_2NH_2$ having a thickness in the order of from $2 \times 10^{-4}$ to $5 \times 10^{-4}$ inches. Then a top coating of the following composition is applied over the primer coating:

| | Parts by weight |
|---|---|
| The above prepared organopolysiloxane composition | 20.0 |
| Dibutyltin dilaurate | 0.8 |
| Xylene | 3.0 | at a wet coating thickness in the order of from $2 \times 10^{-3}$ to $2 \times 10^{-4}$ inches and the coated roller is permitted to air-dry.

The resulting coated roller stands up as well as the roller of Example 1 when used in the lithographic method described in said example.

Similar results are obtained when a Buna N rubber (copolymerization product of butadiene and acrylonitrile) roller is used instead of a neoprene rubber roller in Examples 1 through 4.

While these have been described what is at present considered to be the preferred embodiments of this invention, it will be obvious to those skilled in the art that various changes and modifications may be made therein without departing from the invention, and it is therefore, aimed to cover all such changes and modifications as fall within the true spirit and scope of the invention.

What is claimed is:

1. A dampener roller for applying fountain solution in planographic printing comprising a rubber roller covered with a cured coating comprising a crosslinking silicone resin and a silane of the formula $$(RO)_3Si(CH_2)_3NHCH_2CH_2NH_2$$

in which each R is an alkyl radical of less than four carbon atoms.

2. A dampener roller for applying fountain solution in planographic printing comprising a rubber roller covered with a primer coating of a silane of the formula $$(RO)_3Si(CH_2)_3NHCH_2CH_2NH_2$$

in which each R is an alkyl radical of less than four carbon atoms and a cured top coating of a crosslinked silicone resin.

3. The dampener roller claimed in claim 1, wherein said crosslinking silicone resin is a polysiloxane comprising at least one monomer selected from the group consisting of alkyl siloxanes and aryl siloxanes.

4. The dampener roller defined in claim 3, wherein said crosslinking polysiloxane comprises dimethylsiloxane monomers.

5. The dampener roller defined in claim 3, wherein said crosslinking polysiloxane is methylphenylpolysiloxane.

6. The dampener roller defined in claim 3, wherein said crosslinking polysiloxane comprises dimethyl siloxane monomers, phenyl siloxane monomers and methylsiloxane monomers.

7. A dampener roller for applying fountain solution in planographic printing comprising a rubber roller covered with a cured coating comprising (1) a silane of the formula $$(RO)_3Si(CH_2)_3NHCH_2CH_2NH_2$$

in which each R is an alkyl radical of less than four carbon atoms and a composition comprising (2) a linear, fluid organopolysiloxane containing terminal silicon-bonded hydroxy groups convertible to the cured, solid, elastic state and having a viscosity of from 1,000 to 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (3) an alkyl silicate selected from the class consisting of (a) monomeric organosilicate corresponding to the general formula:

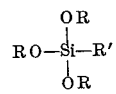

where R is a member selected from the class consisting of alkyl groups and halogen substituted alkyl groups and R' is a member selected from the class consisting of alkyl, halogen substituted alkyl, aryl, aralkyl, alkaryl, alkoxy and aryloxy groups and (b) liquid partial hydrolysis products of the aforementioned organosilicate monomeric compounds, and (4) a metallic salt of an organic monocarboxylic acid in which the metal ion is selected from the class consisting of lead, tin, zirconium, antimony, iron, cadmium, barium, calcium, titanium, bismuth and manganese.

8. A dampener roller for applying fountain solution in planographic printing comprising a rubber roller covered with a primer coating of a silane of the formula $$(RO)_3Si(CH_2)_3NHCH_2CH_2NH_2$$

in which each R is an alkyl radical of less than four carbons and a cured top coating of a composition comprising (1) a linear, fluid organopolysiloxane containing terminal silicon-bonded hydroxy groups convertible to the cured, solid, elastic state and having a viscosity of from 1,000 to 50,000 centipoises when measured at 25° C., the organic groups of the aforesaid organopolysiloxane being selected from the class consisting of monovalent hydrocarbon radicals and halogenated aryl radicals attached to silicon by carbon-silicon linkages, (2) an alkyl silicate selected from the class consisting of (a) monomeric organosilicate corresponding to the general formula:

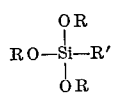

where R is a member selected from the class consisting of alkyl groups and halogen substituted alkyl groups and R' is a member selected from the class consisting of alkyl, halogen substituted alkyl, aryl, aralkyl, alkaryl, alkoxy and aryloxy groups and (b) liquid partial hydroylsis products of the aforementioned organosilicate monomeric compounds and (3) a metallic salt of an organic monocarboxylic acid in which the metal ion is selected from the class consisting of lead, tin, zirconium, antimony, iron, cadmium, barium, calcium, titanium, bismuth and manganese.

9. A dampener roller for applying fountain solution in planographic printing comprising a rubber roller covered with a primer coating of a silane of the formula:

$$(RO)_3Si(CH_2)_3NHCH_2CH_2NH_2$$

in which each R is an alkyl radical of less than four carbons and a cured top coating of a composition comprising (1) a linear, fluid methylpolysiloxane containing terminal silicone-bonded hydroxy groups and having a viscosity of from 1,000 to 50,000 centipoises when measured at 25° C., (2) polyethyl silicate, (3) a tin salt of an organic monocarboxylic acid and (4) a finely divided silicate filler, the polyethyl silicate and tin salt each being present, by weight, in an amount equal to from 0.1 to 5% of the weight of said methylpolysiloxane.

10. The dampener roller of claim 9, wherein said tin salt is dibutyltin dilaurate.

11. The dampener roller of claim 1, wherein said silane is $$(CH_3O)_3Si(CH_2)_3NHCH_2CH_2NH_2$$

12. The dampener roller of claim 1, wherein said silane is $$(C_2H_5O)_3Si(CH_2)_3NHCH_2CH_2NH_2$$

13. The dampener roller of claim 3, wherein said silane is $$(CH_3O)_3Si(CH_2)_3NHCH_2CH_2NH_2$$

14. The dampener roller of claim 3, wherein said silane is $$(C_2H_5O)_3Si(CH_2)_3NHCH_2CH_2NH_2$$

15. The dampener roller of claim 7, wherein said silane is $$(CH_3O)_3Si(CH_2)_3NHCH_2CH_2NH_2$$

16. The dampener roller of claim 7, wherein said silane is $$(C_2H_5O)_3Si(CH_2)_3NHCH_2CH_2NH_2$$

17. The dampener roller of claim 1, wherein said rubber is neoprene rubber.

18. The dampener roller of claim 7, wherein said rubber is neoprene rubber.

References Cited by the Examiner
UNITED STATES PATENTS 2,927,907   3/1960   Polmanteer _____ 260—18
3,070,559  12/1962   Nitzsche et al. _____ 260—18

ROBERT E. PULFREY, *Primary Examiner.*

DAVID KLEIN, *Examiner.*